United States Patent
Maksymczuk et al.

(10) Patent No.: US 7,602,747 B2
(45) Date of Patent: Oct. 13, 2009

(54) SYSTEMS AND METHODS INCREASED MOBILITY AMONG MOBILE NODES IN A WIRELESS NETWORK

(75) Inventors: Tomasz Maksymczuk, Gdynia (PL); Michal Mamczynski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 11/193,275

(22) Filed: Jul. 29, 2005

(65) Prior Publication Data

US 2007/0025292 A1   Feb. 1, 2007

(51) Int. Cl.
*H04W 4/00* (2009.01)
(52) U.S. Cl. ............... 370/331; 370/401; 455/432.1; 455/436
(58) Field of Classification Search ............. 370/310.2, 370/312, 315, 320, 328, 331, 332, 335, 338, 370/390, 400, 401, 408, 432, 465, 467; 455/436–443, 455/432.1, 433, 434
See application file for complete search history.

(56) References Cited

U.S. PATENT DOCUMENTS

| | | | | |
|---|---|---|---|---|
| 6,487,406 | B1 * | 11/2002 | Chang et al. | 455/422.1 |
| 7,082,114 | B1 * | 7/2006 | Engwer et al. | 370/331 |
| 2001/0052025 | A1 * | 12/2001 | Maeda | 709/238 |
| 2002/0188723 | A1 * | 12/2002 | Choi et al. | 709/225 |
| 2003/0110290 | A1 * | 6/2003 | Hiyama et al. | 709/242 |
| 2003/0112778 | A1 * | 6/2003 | Lundby | 370/335 |
| 2004/0047323 | A1 * | 3/2004 | Park et al. | 370/338 |
| 2005/0169202 | A1 * | 8/2005 | Ratasuk et al. | 370/312 |
| 2005/0271020 | A1 * | 12/2005 | Thermond | 370/338 |
| 2006/0020547 | A1 * | 1/2006 | Lipsanen | 705/51 |
| 2006/0166665 | A1 * | 7/2006 | Shinoi | 455/426.1 |
| 2006/0268918 | A1 * | 11/2006 | Olexa et al. | 370/432 |

OTHER PUBLICATIONS

El Malki, K., "Simultaneous Bindings for Mobile IPv6 Fast Handovers <draft-elmalki-mobileip-bicasting-v6-05.txt>", *Networking Working Group, Internet-Draft*, (Oct. 2003), 17 pgs.
Johnson, D., et al., "Mobility Support in IPv6", *Networking Working Group, Request for Comments*: 3775, (Jun. 2004), 157 pgs.
Koodli, R., et al., "Fast Handovers for Mobile IPv6, draft-ietf-mipshop-fast-mipv6-01.tx", *Mobile IP Working Group, Internet Draft*, (Jan. 30, 2004), 39 pgs.
Narten, T., "Neighbor Discovery for IP Version 6 (IPv6)", *Network Working Group, Request for Comments*: 2461, (Dec. 1998), 89 pgs.
Soliman, H., et al., "Hierarchical Mobile IPv6 Mobility Management (HMIPv6) <draft_ietf-mipshop-hmipv6-02.txt>", *Network Working Group, Internet-Draft*, (Jun. 15, 2004), 29 pgs.
Thomson, S., et al., "IPv6 Stateless Address Autoconfiguration", *Network Working Group, Request for Comments*: 2462, (Dec. 1998), 24 pgs.

* cited by examiner

*Primary Examiner*—Ricky Ngo
*Assistant Examiner*—Wei-Po Kao
(74) *Attorney, Agent, or Firm*—Schwegman, Lundberg & Woessner, P.A.

(57) ABSTRACT

An apparatus, comprising a first router to communicatively couple to a mobility anchor point and one or more further routers to n-cast data items to ones of a plurality of mobile nodes that are experiencing similar radio propagation conditions.

17 Claims, 6 Drawing Sheets

SYSTEMS AND METHODS INCREASED MOBILITY AMONG MOBILE NODES IN A WIRELESS NETWORK

TECHNICAL FIELD

Various embodiments described herein relate generally to mobile nodes in a wireless network and more particularly to systems and methods to increase mobility of those mobile nodes.

BACKGROUND

Wireless devices are a ubiquitous part of every user's daily life. Through either a cell phone, Wireless Fidelity (Wi-Fi) capable laptop, or wireless enabled Personal Digital Assistant (PDA), a user may be wirelessly connected to a wireless network continually. However, the user rarely remains fixed in location. The user continually moves about the network. As the user moves about the network, his or her device may require manual reconfiguration with every network change in the worst case, or the user may experience a momentary loss of connection as the device reconfigures itself in the best case. In the latter situation, if the user is using services requiring high Quality of Service (QoS), the user will experience a less than pleasing user experience.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of embodiments of the invention, reference is made to the accompanying drawings which form a part hereof, and in which are shown, by way of illustration, specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed.

This application refers herein to certain Request for Comments (RFC) as defined by the Internet Engineering Task Force (IETF) and the Internet Engineering Steering Group (IESG) which are recorded and published as standards track RFCs. Request for Comment 3775 (D. Johnson, C. Perkins, J. Arkko, "Mobility Support in IPv6," RFC 3775, published June, 2004) specifies a protocol which allows nodes to remain reachable while moving around in the Internet based on Internet Protocol Version 6 (IPv6). Request for Comment 2461 (T. Narten, E. Nordmark, W. Simpson, "Neighbor Discovery for IP Version 6 (IPv6)," RFC 2461, published December 1998) specifies the Neighbor Discovery protocol for IPv6. IPv6 nodes on the same network use Neighbor Discovery to discover each other's presence, to determine each other's link-layer addresses, to find routers and to maintain reachability information about the paths to active neighbors. Request for Comment 2462 (S. Thomson, T. Narten, "IPv6 Stateless Address Autoconfiguration," RFC 2462, published December 1998) specifies the steps a host takes in deciding how to autoconfigure its interfaces in IPv6.

Reference is also made herein to the proposed specification for Hierarchical Mobile IPv6 (HMIPv6). HMIPv6 is being finalized by the Mobile IPv6 Signaling and Handoff Optimization (mipshop) working group of the IETF and deals with reducing the amount and latency of signaling amongst a mobile node, its home agent and one or more correspondents by introducing a mobility anchor point (e.g., a special node located in the network visited by the mobile node). In the proposed specification, the mobility anchor point acts somewhat like a local home agent for the visiting mobile node by limiting the amount of signaling required outside the mobility anchor point's domain. The HMIPv6 proposed specification is currently an Internet Draft and has not yet been advanced to the standards track and RFC status. The current version of the HMIPv6 Internet-Draft, published December 2004, and which expires in June 2005, can be found at http://www.ietf.org/internet-drafts/draft-ietf-mipshop-hmipv6-04.txt. As explained in the Guidelines to Authors of Internet-Drafts, available at http://www.ietf.org/ietf/1id-guideliries.html, last updated on Mar. 25, 2005, Internet-Drafts are draft documents valid for a maximum of six months and may be updated, replaced, or obsoleted by other documents at any time. References herein to the HMIPv6 Internet-Draft are made therefore for informational purposes since it is understood that the HMIPv6 Internet-Draft is a work in progress.

"Data items" as used in the present discussion may include, without limitation: wireless data signals, network packet data, network signals, etc. Wireless data signals may include, without limitation, signals in accordance with one or more of the following standards: Global System for Mobile Communications (GSM); General Packet Radio Service (GPRS); Code Division Multiple Access (CDMA); Time Division Multiple Access (TDMA); IEEE 802.11 standard signals, IEEE std. 802.11-1999, published 1999 and later versions (hereinafter IEEE 802.11 standard); IEEE 802.16 standard signals, IEEE std. 802.16-2001, published 2001 and later versions (hereinafter IEEE 802.16 standard); IEEE 802.15 standard signals, IEEE std. 802.15.1-2003, published 2003, IEEE 802.15.2-2003, published 2003, IEEE 802.15.3-2003, published 2003 and later versions (hereinafter IEEE 802.15 standard); Wide Band CDMA (WCDMA); High Speed Downlink Packet Access (HSDPA); or Ultra WideBand (UWB). Though specific types of wireless signals are listed above, for the embodiments herein it is to be appreciated that any signal that passes between two devices without a wire is considered to be a wireless signal. Though mention is made here to wireless signals, the systems and methods described herein apply equally to wired as well as wireless networks in the context of router to router communications.

The term "router" as used herein is meant to denote any device on a network configured to receive data items addressed to other devices on the network and forward those data items to the appropriate device using any suitable communications protocol.

Figure 1A:
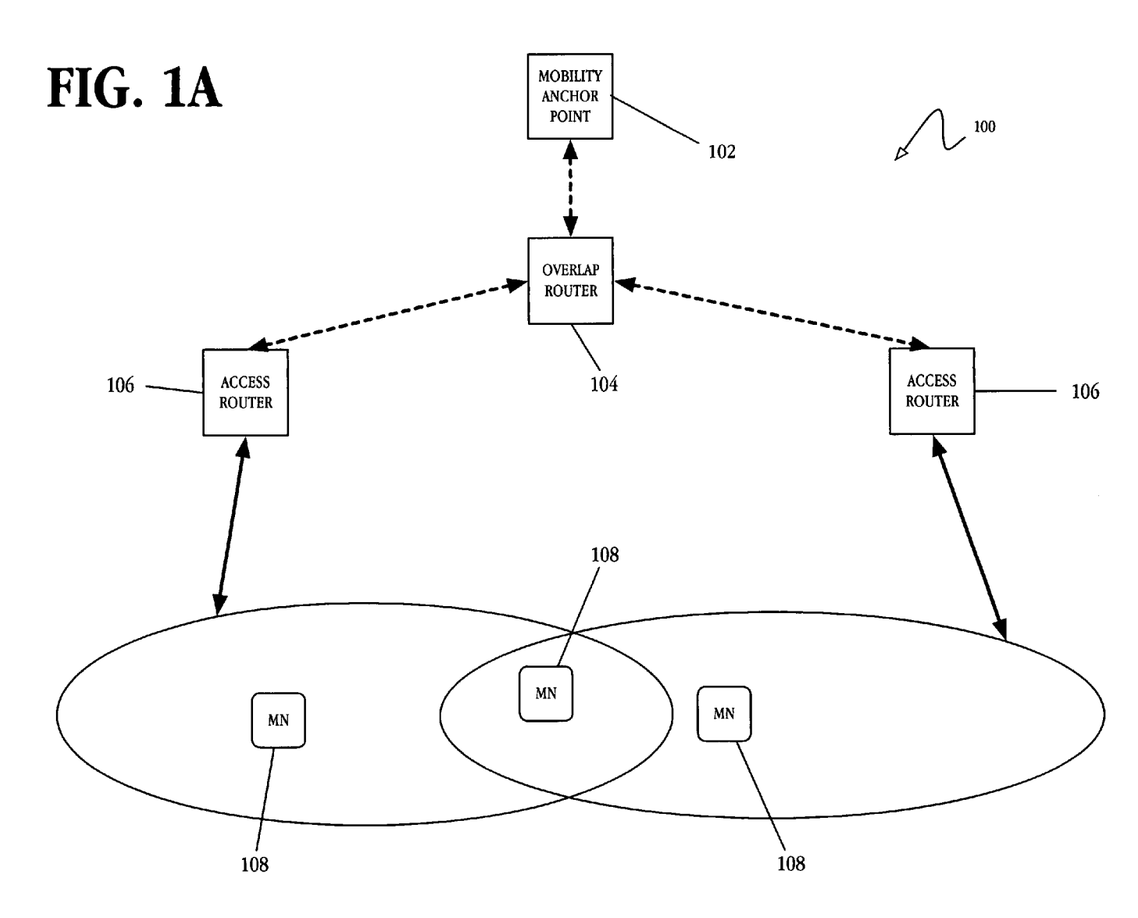
FIG. 1A is a network of wireless interconnected mobile nodes according to embodiments of the present invention.

FIG. 1A is a network of wireless interconnected mobile nodes according to embodiments of the present invention. In an embodiment, a network 100 includes a mobility anchor point (MAP) device 102, one or more overlap router devices (OR) 104, one or more access router devices (AR) 106 and one or more mobile node devices (MN) 108. In an embodiment, data signals are communicated between any or all of the devices on the network 100.

In an embodiment, the MAP 102 is a device located in the network 100 accessible by one or more MNs 108. Accessible, includes, without limitation the ability of a MN 108 to communicatively connect to and begin transmitting data items to and receiving data items from ARs 106 on the network 100, and through the ARs 106 and other devices on the network, the MN 108 is capable of transmitting and receiving data items to and from the MAP 102. In an embodiment, the MAP 102 is used by the one or more MNs 108 as a local home agent (HA). The MAP 102 as a local HA for the one or more MNs 108 allows seamless connectivity for the one or more MNs 108 as the MNs 108 move around in the network 100. Though depicted as a single device in FIG. 1A, it is understood that there can be more than one MAP 102 in any given network.

In an embodiment, the ARs 106 are devices on the network accessible to one or more MNs 108. In an embodiment, each of the ARs 106 is configured to be a default router for one or more MNs 108. Each of the ARs 106 is further configured to aggregate the outbound traffic or data items from the one or more MNs 108 to the network 100.

In an embodiment, the MNs 108 are devices, such as, without limitation, computers, mobile phones, or PDA's, configured to communicate wirelessly with at least one AR 106 using MIPv6 as the network protocol. MIPv6 as described in RFC 3775 and HMIPv6 as described in the proposed specification provide a network structure in which a MN 108 can move about the network 100 and still maintain a network connection. As the MN 108 moves from a communicative connection with a first AR 106 to a second AR 106, the network 100 is configured to handoff communications from the first AR 106 to the second AR 106. Through this operation, most data items addressed to and coming from the MN 108 are delivered to their intended recipient.

Using FIG. 1A as a reference, operations of the MNs 108 as they communicate with the network 100 can be discussed. In an embodiment, as a MN 108 enters the network 100 and begins to communicate with an AR 106, it is configured to detect the presence of a MIPv6 network and send an initial local binding update (LBU) to the MAP 102 and the MAP 102 is configured to operate as the HA for the MN 108 and configure a Regional Care of Address (RCoA) for the MN 108. The RCoA of the MN 108 is a network address that devices outside the network 100 can use for communications with the MN 108 without needing to know the exact network address of the MN 108. The RCoA further allows the MN 108 to move from communicating with one AR 106 to any other AR 106 without a change in its RCoA, requiring no configuration change with a host outside the network that the MN 108 may be communicating with during that move. Data items received by the MAP 102 addressed to the RCoA of the MN 108 are forwarded to the MN 108 as outlined in MIPv6 and in the present discussion. As the MN 108 moves from communicating with one AR 106 to another AR 106, it is further configured to send additional binding updates to the MAP 102.

In an embodiment, the OR 104 is a device configured to receive data items from the MAP 102 that are addressed to a MN 108. In a further embodiment, the OR 104 is further configured to read a hop-by-hop extension option in the header of the data item and forward the data item based on that option. In one embodiment, the OR 104 is a separate device. In another embodiment, the functionality of the OR 104 may be contained either in an AR 106 or the MAP 102. Such an arrangement may be advantageous and allow the network 100 to maintain operations if one or more, but not all, devices on the network 100 fail.

In an embodiment, a MN 108 communicating with an AR 106 is assigned to a dedicated subnet specific to that AR 106. All network traffic received by the MAP 102 addressed to the RCoA of the MN 108 is re-addressed with the subnet prefix of the AR 106 with which the MN 108 is communicating. In one embodiment, the subnet prefix changes as network operations are handed off from one AR 106 to another AR 106. In such an arrangement, any additional network traffic received by the MAP 102 addressed to the RCoA of the MN 108 is re-addressed to the new subnet prefix.

A MN 108 can experience similar radio propagation conditions from more than one AR 106. In the context of the above discussion, the MN 108 maintains communications with only one of the ARs 106. Only when the MN 108 moves or the AR 106 it is communicating with ceases to send and receive network traffic, does the MN 108 hand off network operations to the other AR 106. This creates a hand-off period during which important data can be lost.

In an embodiment, the MN 108 is configured to send measurement reports to the AR 106 when first associating with the AR 106. The MN 108 is further configured to send a measurement report when any change in the quality of the link between the MN 108 and any AR 106 that the MN 108 can communicate with is detected. If the MN 108 is communicating with more than one AR 106, the measurement report is sent to only one AR 106. In an embodiment, the measurement report is a report detailing the radio link quality between the MN 108 and an AR 106. In a further embodiment, the measurement report contains, without limitation, a set of tuples, comprising: access network identity, and signal quality/strength. In one embodiment, the measurement report is sent to the AR 106 using underlying Layer 2 mechanisms as outlined in the Open System Interconnection (OSI) Network Model. In another embodiment, the measurement report is sent using a Router Solicitation message as defined by RFC2461. As provided for in RFC 2461, Router Solicitation messages are messages that request routers to generate a response immediately. In such an arrangement, the measurement report also comprises information additional to the standard Router Solicitation message as described in RFC 2461.

In an embodiment, ARs 106 are configured to receive the measurement report from a MN 108 and prepare an advertisement message based on the received measurement report. In an embodiment, the advertisement message is a message from the AR 106 to the MN 108 providing information regarding network access, including, but not limited to, subnet prefix assignments. The AR 106 maintains a local database and is configured to compare the received measurement report with data in the local database. In an embodiment, the records in the local database may contain, without limitation, information regarding: access network identity; signal quality threshold with respect to the link between a MN 108 and an AR 106; and associated IPv6 subnets. In a further embodiment, overlap subnets may be advertised. Overlap subnets are a subset of regular IPv6 subnets. In an embodiment, and IPv6 subnet is an overlap subnet if there exists another (or many other) subnet(s) that can be used to communicate with the MN 108 with similar link quality. In an embodiment, the association between overlap subnets is maintained in the OR 104.

The MN 108 is capable of auto-configuring its IPv6 address as outlined in RFC 2462. In an embodiment, the MN 108 is further configured to autoconfigure new IP addresses belonging to all assigned overlap subnet prefixes when an advertisement message is received containing overlap subnet prefixes. The MN 108 is configured to use the same interface identifier on all overlap subnets. In a further embodiment, the MN 108 is further configured to send a Local Binding Update (LBU) to the MAP 102 to register the new RCoA which is the auto-configured IPv6 address from the one or more overlap subnets. In such an arrangement, the MAP 102 is further configured to tunnel packets to the RCoA registered by the MN 108. In an embodiment, the MAP 102 is configured to construct a packet with an outer packet header followed by a hop-by-hop extension option and initiate the hop-by-hop extension option to zero. In a further embodiment the hop-by-hop extension header may carry a Multihoming in Overlap Subnets for IP Micro-mobility Robustness (MUHOMOR) hop-by-hop option.

Figure 1B:
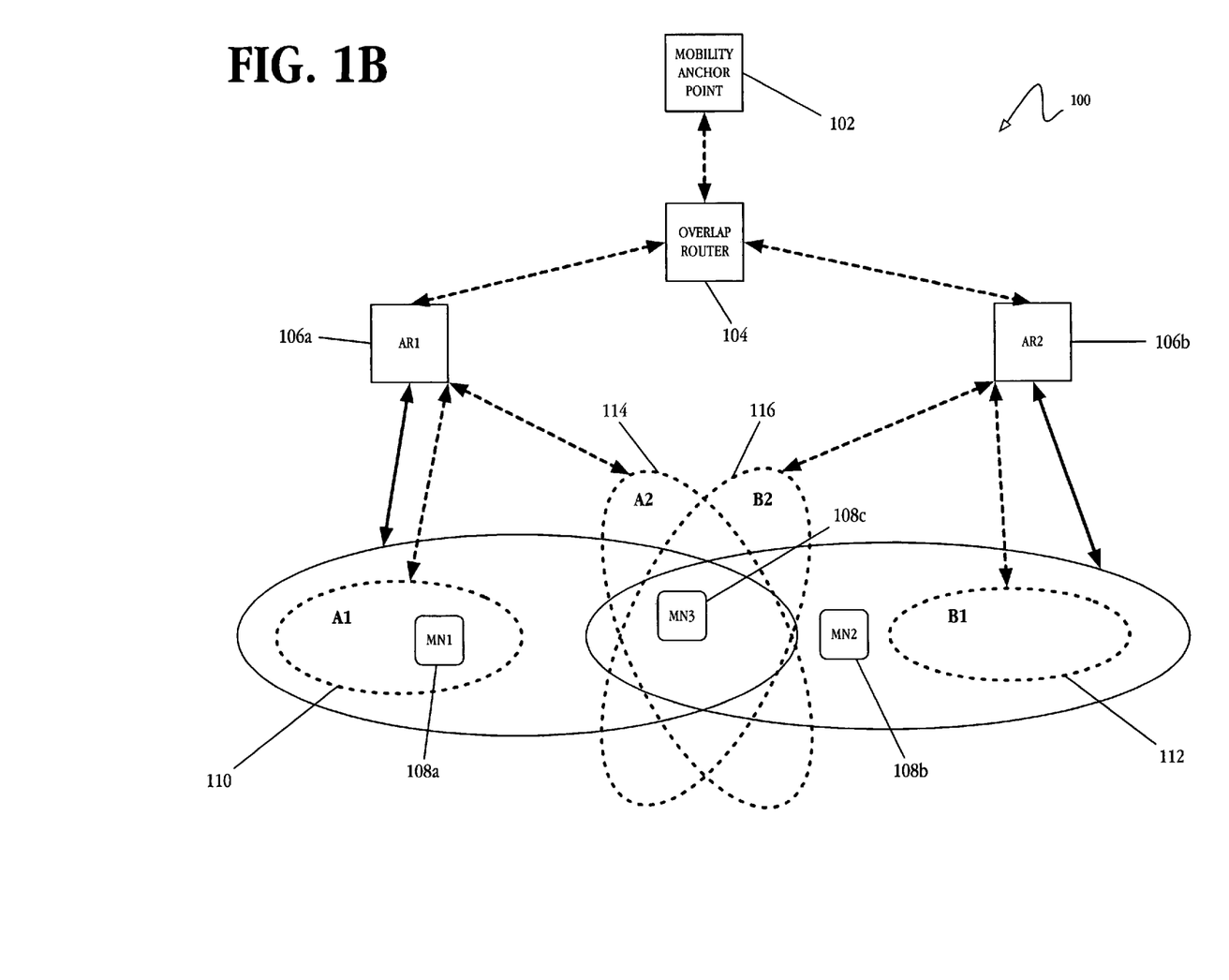
FIG. 1B is a network of wireless interconnected mobile nodes according to embodiments of the present invention.

FIG. 1B is a network of wireless interconnected mobile nodes according to embodiments of the present invention. FIG. 1B is similar to FIG. 1A with the addition of specific references to the relationship between multiple devices communicating on the network 100.

In an embodiment, when a MN 108 is able to communicate with two or more ARs 106, all of the ARs 106 are configured to include subnet prefix information for each of the two or more ARs 106 in any advertisement message sent to the MN 108. In such an arrangement, using FIG. 1B as an example, MN1 108a receives an advertisement message with the A1 110 subnet prefix only when measuring a good link with AR1 106a. If receiving a good signal from the AR2 106b, the MN2 108b receives an advertisement message with the B1 112 subnet prefix. In the case of the MN3 108c, which is measuring a good link with both the AR1 106a and the AR2 106b, the advertisement message contains both the A2 114 and B2 116 subnet prefixes.

Figure 2:
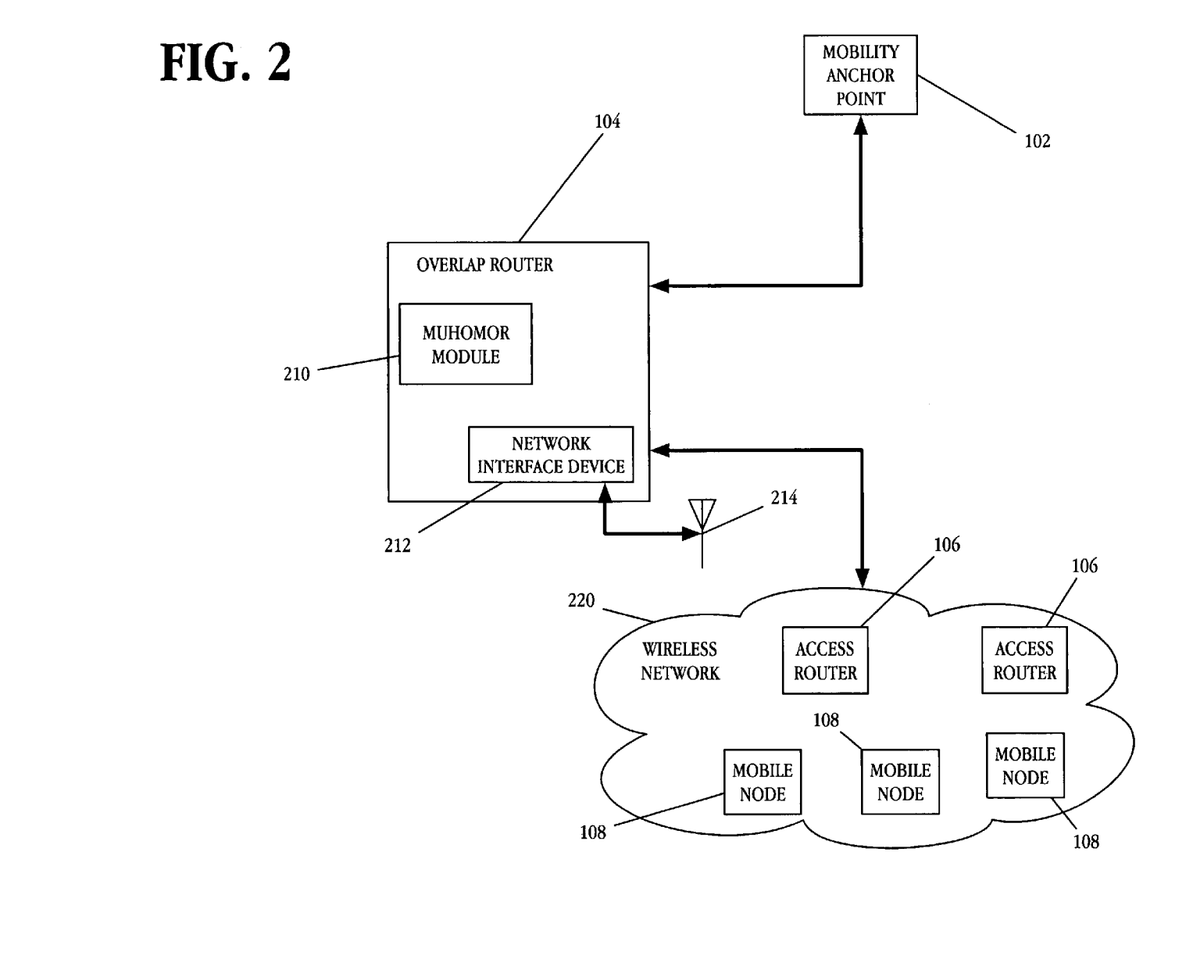
FIG. 2 is a high level block diagram of a system according to embodiments of the present invention.

FIG. 2 is a high level block diagram of a device according to embodiments of the present invention. In an embodiment, the device is an OR 104 as contemplated above with respect to FIG. 1A. In an embodiment, the OR 104 comprises a MUHOMOR module 210 and a network interface 212. In another embodiment, the OR 104 is operably coupled to an antenna 214. The antenna 214 may include one or more of a patch, omni-directional, beam, monopole, dipole, and rhombic antenna, among others. Though the antenna 214 depicted as external to the OR 104, it is understood that the antenna 214 may be integral to the OR 104 and such depiction is not to be taken in any limiting way. In another embodiment, the AR 106 is operably coupled to an antenna similar to the antenna depicted in FIG. 2 and described here. Additionally, the OR 104 is coupled to a wireless network 220. The wireless network 220 includes one or more ARs 106 and one or more MNs 108.

In an embodiment, the MUHOMOR module 210 is configured to receive data items addressed to a MN 108, read a configurable option in the data item and process the data item based on the configurable option in the data item. In an embodiment, the configurable option is a MUHOMOR option. In one embodiment, the MUHOMOR module 210 n-casts the data item to the MN 108 if the MUHOMOR option is set to a non-zero value. In such an arrangement, the MN 108 is configured to multihome on several subnets concurrently and receive n-cast data items sent from the OR 104. "Multi-homing" as used herein is a MN's 108 ability to have multiple network addresses in one computer, usually on different networks. In an embodiment, the MAP 102 is configured to insert the configurable option in each data item received by the MAP 102 addressed to the RCoA of a MN 108. In another embodiment, the MAP initializes the configurable option to zero when inserting the configurable option.

Figure 3:
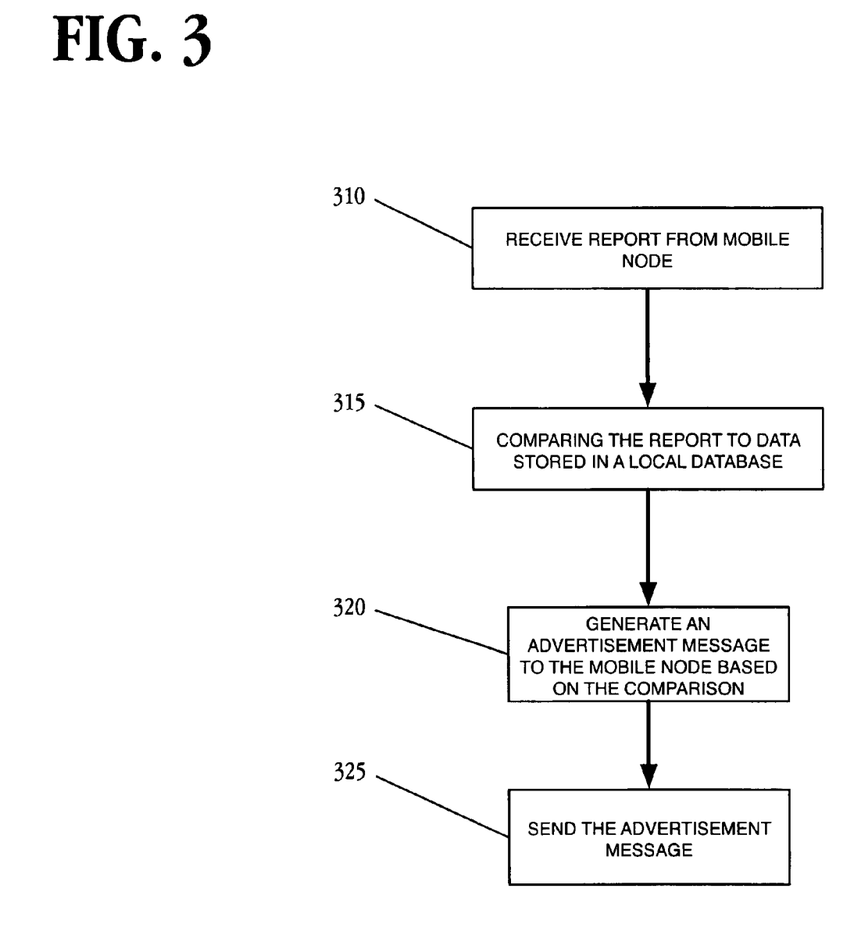
FIG. 3 is a flowchart of a method according to embodiments of the present invention.

FIG. 3 is a flowchart of a method that could be carried out on a device such as those depicted in FIG. 1A and FIG. 2, according to embodiments of the present invention. In one embodiment, the operations described in FIG. 3 are carried out in an AR 106 as depicted in FIG. 1A. In a further embodiment, the functions of the AR 106 and the OR 104 are combined in a single device. In such an arrangement, the operations described here can be carried out on that single device.

At block 310, the device receives a report from one or more mobile nodes, such as the MN 108 depicted in FIG. 1A. In an embodiment, the report is a measurement report detailing the radio propagation conditions that the MN 108 is experiencing with respect to the AR 106. In another embodiment, the measurement report contains information with respect to all ARs 106 that the MN 108 can communicate with. In a further embodiment, the measurement report is a report regarding the radio propagation conditions that the MN 108 is experiencing with respect to the ARs 106 that it can communicate with.

At block 315, the device compares data in the received report with data stored in a local database. Records in the local database can include, without limitation, access network identity, signal quality threshold and associated IPv6 subnets. In an embodiment, the device compares the link quality reported by the MN 108 with at least one AR 106, and the signal quality threshold contained in the record for the at least one AR 106. In another embodiment, the device compares the link quality reported by the MN 108 with the signal quality threshold for each of the ARs 106. In such an example, if the link quality exceeds the signal quality threshold of any of the ARs 106, the MN 108 has a good link with each of those ARs 106.

In another embodiment, the device compares some other value contained in the measurement report and compares that value with similar data stored in the local database to determine if the some other value exceeds a threshold value for that type of measurement. If it is determined that it does, the MN 108 is determined to have a good link. In such an example, the device determines if the MN 108 has a good link with any of the ARs 106 based on that comparison. In an embodiment, the device assigns one or more subnet prefixes from a group of subnet prefixes associated with each of the ARs 106 that the MN 108 has a good link with. In such an arrangement, the device assigns the one or more subnet prefixes to the MN. If the MN 108 has a good link with only one AR 106, a single subnet prefix is chosen. If the MN 108 has a good link with more than one AR 106, more than one subnet prefix is chosen. In an embodiment, when more than one subnet prefix is assigned to a MN 108, the MN 108 is configured to receive data items addressed to each of the subnet prefixes.

At block 320, the device generates an advertisement message based on the comparison. In an embodiment, the advertisement message contains the assigned subnet prefix as discussed above. At block 325 the device sends the advertisement message to the MN 108 from which it received the report. In an embodiment, if the MN 108 has a good link with only one AR 106, the advertisement message contains one subnet prefix. The MN 108 receives the advertisement message and broadcasts a LBU message to the MAP 102 with that subnet prefix and the RCoA of the MN 108. Further network traffic addressed to the RCoA of the MN 108 is re-addressed to this subnet prefix and forwarded using standard IPv6 forwarding methods.

In an embodiment, if the MN 108 has a good link with more than one AR 106, the device receiving the measurement report generates an advertisement message containing the subnet prefixes of all ARs 106 with which the MN 108 has a good link. The subnet prefixes described here are subnet prefixes assigned to the MNs 108 that are experiencing similar link quality conditions with two or more ARs 106 such that network traffic addressed to the RCoA of the MNs 108 can be handled differently than network traffic addressed to a MN 108 communicating with only a single AR 106. The MN 108 receives this advertisement message and auto-configures new IPv6 addresses belonging to all assigned subnets. The MN 108 sends an LBU message to the MAP 102 and all network traffic addressed to the RCoA of the MN 108 is re-addressed to the assigned subnets.

With reference to FIG. 1B, an exemplary situation can be described with respect to block 315 of FIG. 3. In FIG. 1B, the measurement report sent by MN3 108c contains information related to the link quality of both the link to the AR1 106a and the AR2 106b. The measurement report may be sent to either the AR1 106a or the AR2 106b as the MN3 108c has a communicative connection with both the AR1 106a and the AR2 106b. The AR receiving the report, compares the report to its local database and determines that the MN3 108c has a good link with both the AR1 106a and the AR2 106b. The advertisement message sent to the MN3 108c contains the subnet prefixes for both the AR1 106a and the AR2 106b, allowing the MN3 108c to auto-configure using the both subnet prefixes and send the LBU to the MAP 102. The MAP 102 then registers the RCoA of the MN3 108c and re-addresses all packets addressed to the RCoA with both the subnet for the AR1 106a and the AR2 106b and sends that packet downstream towards the MN3 108c through both the AR1 106a and the AR2 106b.

At block 320, data items addressed to mobile nodes assigned to more than one subnet are n-cast to all subnets assigned to the mobile node. With reference to the discussion above in regards to the MN3 108c, data items addressed to the RCoA of the MN3 108c is n-cast to the two subnets assigned to the MN3 108c. As will be understood by those skilled in the art, this is the simple case. In other embodiments, a MN 108 may experience similar radio propagation conditions or a good link from more than two access routers. In such an arrangement, the data items addressed to the RCoA of the MN 108 are n-cast to all subnet prefixes assigned to the MN 108.

Figure 4:
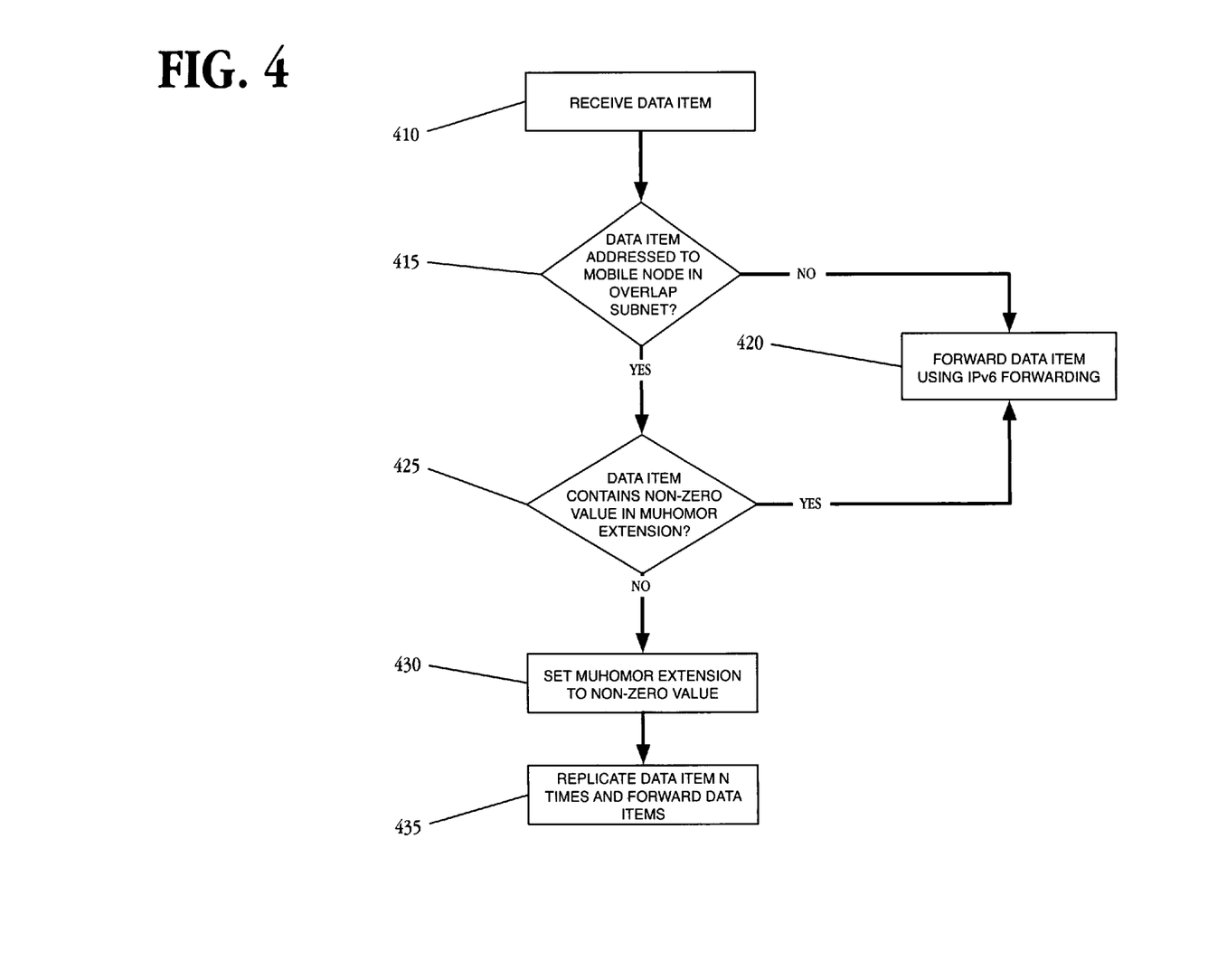
FIG. 4 is a flowchart of a method according to embodiments of the present invention.

FIG. 4 is a flowchart of a method according to embodiments of the present invention. In one embodiment, the operations described in FIG. 4 are carried out in an OR 104 as depicted in FIG. 1A and FIG. 2. In another embodiment, the operations described are carried out in a MAP 102 as depicted in FIG. 1A and FIG. 2. In yet another embodiment, the operations are carried out in an AR 106 as depicted in FIG. 1A. In a further embodiment, functions of the AR 106, OR 104 or MAP 102 are combined in a single device. In such an arrangement, the operations described in FIG. 4 are carried out in that single device.

At block 410 the device receives data items addressed to a MN 108. At block 415, the device determines if the MN 108 is in an overlap subnet. If the MN 108 is not in an overlap subnet, the data item is forwarded to the MN 108 using standard forwarding at block 420. Standard forwarding includes, without limitation, IPv6 forwarding. If the MN 108 is in an overlap subnet, operations continue at block 425.

At block 425, the device reads a configurable option in the header of the data item. In an embodiment, the configurable option in the header of the data item includes a hop-by-hop extension header. In one embodiment, the configurable option includes a MUHOMOR hop-by-hop extension header. If the configurable option is set to a non-zero value, the data item is forwarded using standard IPv6 forwarding at block 420. If the configurable option is set to a zero value, the device sets the configurable option to a non-zero value at block 430. In an embodiment, the configurable option is set to the value of a global counter maintained by the device. In a further embodiment, the global counter is incremented. In such an arrangement, the global counter must skip zero when the counter flips to zero.

At block 435, the data item is replicated n-times and each of the replicated data items is forwarded to each of the subnet prefixes assigned to the MN 108 to which the data item is addressed. In a case where the MN 108 is assigned two subnet prefixes, the data item is duplicated. In an embodiment, a non-zero value in the MUHOMOR hop-by-hop extension header allows for redundancy among overlap routers in that an overlap router downstream of the first overlap router is still configured to perform the operations outlined here, but only when the upstream overlap router fails will the downstream overlap router n-cast the received data items.

In an embodiment, each device in the network 100 depicted in FIG. 1 that receives data items addressed to mobile nodes and sends those data items is configured to read the configurable option as outlined above. In such an arrangement, downstream ARs 106 are configured to handle operations normally performed by the upstream OR's 104 if such upstream OR's 104 fail. In a further embodiment, the functions of the OR 104 are contained in the MAP 102, such that the MAP 102 is configured to not only receive and send data items as outlined in RFC 3775, but to also read the configurable option and perform the operations outlined above.

Figure 5:
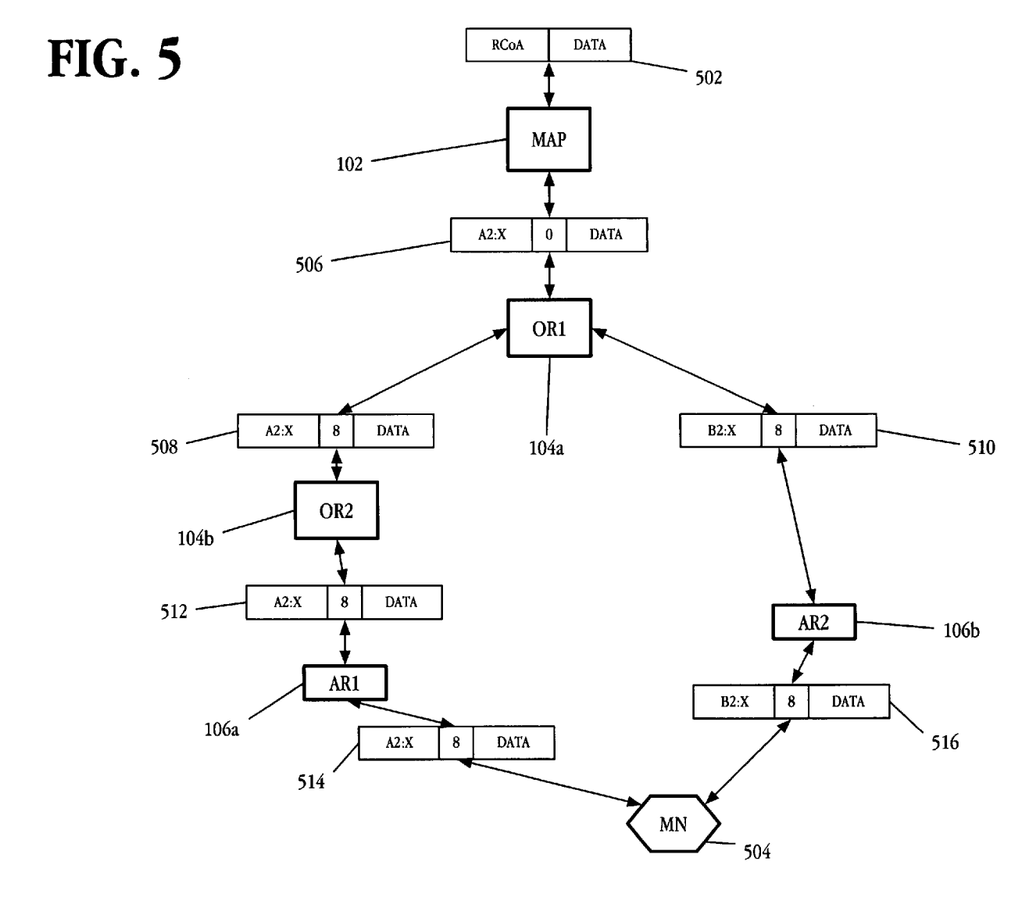
FIG. 5 is an example dataflow diagram according to embodiments of the present invention.

FIG. 5 is an example dataflow diagram according to embodiments of the present invention. A first network packet 502 is received by a MAP 102. The first network packet 502 is addressed to the RCoA of a MN 504. For the purposes of the example dataflow diagram in FIG. 5, it is to be assumed that the MN 504 has a good link with both the AR1 106a and the AR2 106b.

The MAP 102 is configured to receive the first network packet 502 and tunnel the packet 502 to the RCoA of the MN 504, wrapping an outer IPv6 header followed by the hop-by-hop extension header carrying the MUHOMOR hop-by-hop option as outlined above around the received first network packet 502. The option would carry a counter that the MAP 102 would initiate to 0, as shown in the second network packet 506.

The second network packet 506 is received by an OR 104 and the MUHOMOR option is read. In this case, the received packet 506 contains a zero value in the MUHOMOR option of the packet header as initiated by the MAP 102 and the MN 504 has a good link with both the AR1 106a and the AR2 106b. As discussed above, a determination as to which access router that a mobile node has a good link with is performed by comparing any data indicative of link quality in a measurement report received from a mobile node with similar data indicative of link quality contained in a local database accessible to the access router Examples of such data indicative of link quality include, without limitation, signal to noise ratio, signal strength, noise level, number of devices communicating with the access router, and the like. A good link is an indication that the mobile node is experiencing an acceptable communicative connection with the access router and data items can be transmitted from the access router to the mobile node with a high probability of successful delivery.

As discussed above with respect to FIG. 4, had the MN 504 not been in an overlap subnet, the received packet would have been forwarded using standard IPv6 forwarding, however in the present example; further processing is required as the MN 504 is in an overlap subnet. As the MN 504 is in an overlap subnet, the OR1 104a inserts a non-zero value into the MUHOMOR option of the network packet 506. Following insertion of a non-zero value into the MUHOMOR option of the network packet, the OR1 104a duplicates the network packet in this case, replicates n-times in the general case, and sends those network packets to the appropriate overlap subnets. For the packets addressed to the AR1 106a subnet, the packets contain the AR1 106a overlap subnet prefix (A2 in FIG. 5), a non-zero value of 8 in this example in the MUHOMOR option and the data contained in the first network packet as shown in network packet 508. For the packets addressed to the AR2 106b subnet, the packets contain the AR2 106b subnet prefix (B2 in FIG. 5), a non-zero value of 8, in this example, in the MUHOMOR option and the data contained in the first network packet as shown in network packet 510.

Between OR1 104a and AR1 106a, there is an additional overlap router, the OR2 104b. The OR2 104b receives the network packet in the same manner as the OR1 104a. In the example of FIG. 5, the OR2 104b determines that the MN 504 the network packet 508 is addressed to is experiencing similar radio propagation conditions from both the AR1 106a and the AR2 106b. The OR2 104b reads the MUHOMOR option in the network packet 508, determines that it contains a non-zero value of 8 in this example and forwards the packet using standard IPv6 forwarding as shown in network packet 512. A second overlap router, as outlined in this example, provides for redundancy in the event that the OR1 104a fails. Additionally, if all upstream ORs fail, it is advantageous if the AR communicating with the MN 504 has the option of performing the same operations. The AR1 106a receives the forwarded packet 512 from the OR2 104b and forwards the packet 514 to the MN 504. Further, in the situation where multiple overlap routers are present the MUHOMOR option ensures that the network packet is only processed once by an overlap router using the methods discussed here, preventing loops in network operations.

For packets addressed to the B2 overlap subnet prefix of the AR2 106b, the AR2 106b receives the network packet 510 addressed to the B2 subnet prefix and forward that network packet 516 to the MN 504.

The MN 504 in this example receives duplicate packets containing the same data. The MN 504 is configured to multihome on both the A2 subnet and the B2 subnet concurrently. Any method suitable to provide for multihoming on a mobile node can be used as are well known in the art, and are considered to be within the scope of the present discussion.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments and other embodiments not specifically described herein will be apparent to those of skill in the art upon reviewing the above description.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the scope or meaning of the claims. Additionally, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the terms "comprising" and "wherein," respectively. Moreover, the terms "first," "second," and "third," etc. are used merely as labels, and are not intended to impose numerical requirements on their objects.

What is claimed is:

1. An apparatus, comprising:
a network including an overlap router communicatively coupled to a mobility anchor point and to a plurality of access routers, each of the plurality of access routers including a local database and having a different subnet prefix address, each of the plurality of access routers is configured to receive one or more measurement reports from one or more mobile nodes including information with respect to which of the plurality of access routers a given mobile node can have communication with;
each of the access routers is configured to compare received measurement reports to one or more thresholds stored in the local database coupled to the access router, and to communicate to the given mobile node an advertisement messages including a subnet prefix of each of the plurality of access routers that the given mobile node has a good communication link with based on the received one or more measurement reports;
the mobility anchor point is configured to be communicatively coupled to any of the given mobile nodes through one or more of the plurality of access routes and through the overlap router, the mobility anchor point is configured to be a local home agent for each of the given mobile node and to receive from each of the given mobile nodes a local binding update and a listing of all of the subnet prefixes for which the given mobile node has a good communication link established with, the mobility anchor point is configured to configure a Regional Care of Address for the given mobile node, the Regional Care of Address information is configured to allow one or more devices outside the network to have communication through the mobility anchor point with the given mobile node associated with the Regional Care of Address without having to know any of the subnet prefixes assigned to the given mobile node;
the overlap router is configured to receive data items addressed to the Regional Care Address of a particular mobile node, to re-address the data to include any of the at least one subnet prefixes sent to the mobility anchor point for the particular mobile node, and to n-cast the data items to all of the plurality of access routers that have subnet prefixes assigned to the particular mobile node.

2. The apparatus of claim 1, wherein the overlap router is to n-cast the data items to more than one of the plurality of access routers.

3. The apparatus of claim 1, wherein the overlap router includes a MUHOMOR module, and is to n-cast the data items only to ones of the access routers that are experiencing communications with the particular mobile node at a signal quality that exceeds a signal quality threshold using a configuration option that includes MUHOMOR option.

4. The apparatus of claim 1, wherein one or more of the one or more access routers is configured to communicate on at least of a WCDMA network or a broadband wireless access network.

5. The apparatus of claim 1, wherein the particular mobile node is configured to multihome.

6. A method comprising:
receiving a measurement report from a mobile node, the measurement report containing information including the link quality between the mobile node and one or more access routers that the mobile node can have communication with;
comparing data in the measurement report with data stored in a local database coupled to the access routers to determine which of the access routers the mobile node has a good link with;
assigning to the mobile node one or more subnet prefixes, each of the one or more subnet prefixes associated with one of the access routers that the mobile node has a good link with;
generating an advertisement message, where the advertisement message contains the one or more subnet prefixes assigned to the mobile node;
sending the advertisement message to the mobile node;
transmitting from the mobile node to a mobility anchor point coupled to the one or more access routers a local binding update and a listing of at least one subnet prefix included in the advertisement message sent to the mobile unit;
configuring at the mobility anchor point a Regional Care of Address for the mobile node;
configuring the mobile node to receive data items addressed to Regional Care of Address for the mobile node;
receiving at the mobility anchor point data items addressed to the Regional Care of Address for the mobile node;
re-addressing the data items to include addresses for each of the subnet prefixes for the mobile node; and
n-casting the re-addressed data items to all of the plurality of access routers that have subnet prefixes assigned to the particular mobile node.

7. The method of claim 6, wherein the data stored in the local database includes information related to the one or more access routers in a wireless network accessible to the mobile node.

8. The method of claim 6, wherein the data stored in the local database includes at least signal quality threshold data for the one or more access routers.

9. The method of claim 8, wherein data in the measurement report includes data relating to a link quality between the mobile node and the one or more access routers.

10. The method of claim 9, wherein comparing includes comparing the link quality data in the measurement report with the signal quality data threshold for the one or more access routers.

11. The method of claim 10, wherein the advertisement message contains a single subnet prefix if the link quality data exceeds the signal quality threshold data for one of the one or more access routers.

12. The method of claim 10, wherein the advertisement message contains more than one subnet prefix if the link quality data exceeds the signal quality threshold data for more than one of the one or more access routers.

13. The method of claim 6, wherein the mobile node is to receive the advertisement message and send to a mobility anchor point a local binding update message containing the two or more subnet prefixes.

14. A system, comprising:
a network including an overlap router communicatively coupled to a mobility anchor point and to a plurality of access routers, each of the plurality of access routers including a local database and having a different subnet prefix address, each of the plurality of access routers is configured to receive one or more measurement reports from one or more mobile nodes including information with respect to which of the plurality of access routers a given mobile node can have communication with;
each of the access routers is configured to compare received measurement reports to one or more thresholds stored in the local database coupled to the access router, and to communicate to the given mobile node an advertisement messages including a subnet prefix of each of the plurality of access routers that the given mobile node has a good communication link with based on the received one or more measurement reports;
the mobility anchor point is configured to be communicatively coupled to any of the given mobile nodes through one or more of the plurality of access routes and through the overlap router, the mobility anchor point is configured to be a local home agent for each of the given mobile node and to receive from each of the given mobile nodes a local binding update and a listing of all of the subnet prefixes for which the given mobile node has a good communication link established with, the mobility anchor point is configured to configure a Regional Care of Address for the given mobile node, the Regional Care of Address information is configured to allow one or more devices outside the network to have communication through the mobility anchor point with the given mobile node associated with the Regional Care of Address without having to know any of the subnet prefixes assigned to the given mobile node;
the overlap router is configured to receive data items addressed to the Regional Care Address of a particular mobile node, to re-address the data to include any of the at least one subnet prefixes sent to the mobility anchor point for the particular mobile node, and to n-cast the data items to all of the plurality of access routers that have subnet prefixes assigned to the particular mobile node;
at least one network interface device coupled to the overlap router; and
at least one omni-directional antenna coupled to the overlap router.

15. The system of claim 14, wherein the at least one network interface device is to communicate using Internet Protocol Version 6.

16. The system of claim 14, further comprising a mobility anchor point communicatively coupled to each of the access routers through the overlay router.

17. The system of claim 14, wherein the overlay router comprises a MUHOMOR module, the MUHOMOR module coupled to the mobility anchor point and the network interface device, the MUHOMOR module to received the data items and to n-cast the data items to the particular mobile node through each of the plurality of access routers associated with the subnet prefixes assigned to the particular mobile node.

* * * * *

UNITED STATES PATENT AND TRADEMARK OFFICE
CERTIFICATE OF CORRECTION

PATENT NO. : 7,602,747 B2  Page 1 of 1
APPLICATION NO. : 11/193275
DATED : October 13, 2009
INVENTOR(S) : Tomasz Maksymczuk et al.

It is certified that error appears in the above-identified patent and that said Letters Patent is hereby corrected as shown below:

On the Title page, in field (54), in "Title", in column 1, line 1, after "METHODS" insert -- FOR --.

In column 1, line 1, after "METHODS" insert -- FOR --.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,602,747 B2 Page 1 of 1
APPLICATION NO. : 11/193275
DATED : October 13, 2009
INVENTOR(S) : Maksymczuk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this

Fifth Day of October, 2010

David J. Kappos
*Director of the United States Patent and Trademark Office*